United States Patent [19]

Rix

[11] Patent Number: 5,334,090

[45] Date of Patent: Aug. 2, 1994

[54] INTEGRATED CABIN PRESSURE CONTROLLER

[75] Inventor: John F. Rix, Tucson, Ariz.

[73] Assignee: AlliedSignal Inc., Morris Township, Morris County, N.J.

[21] Appl. No.: 951,070

[22] Filed: Sep. 25, 1992

[51] Int. Cl.$^5$ .............................................. B64D 13/04
[52] U.S. Cl. ................................................... 454/72
[58] Field of Search ........................ 454/71, 72, 73, 74

[56] References Cited

U.S. PATENT DOCUMENTS 4,164,894 8/1979 Yamanaka .............................. 454/72
4,164,898 8/1979 Burgess et al. ........................ 454/72
4,164,899 8/1979 Burgess ................................. 454/72

*Primary Examiner*—Harold Joyce
*Attorney, Agent, or Firm*—Robert A. Walsh; Joseph R. Black

[57] ABSTRACT

A cabin pressure controller includes primary and backup controllers, a selector and a display mounted onto or within a single housing. The primary and backup controllers communicate through a communication link, jumpered across an external connector. Such a link allows for electrical isolation between the controllers.

20 Claims, 2 Drawing Sheets

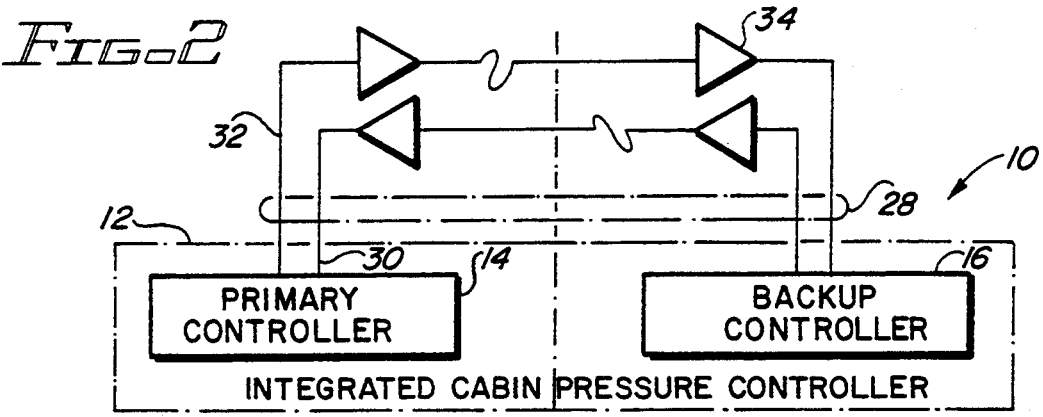
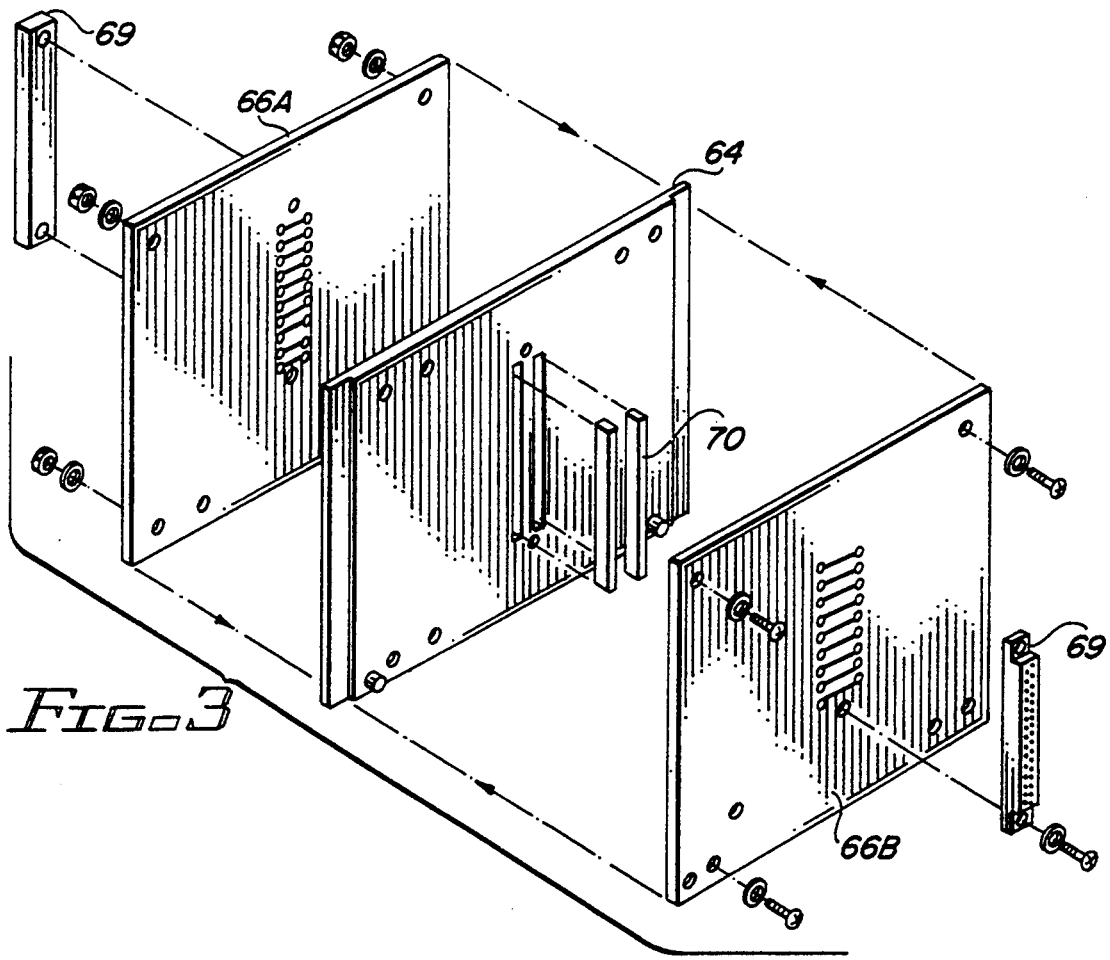
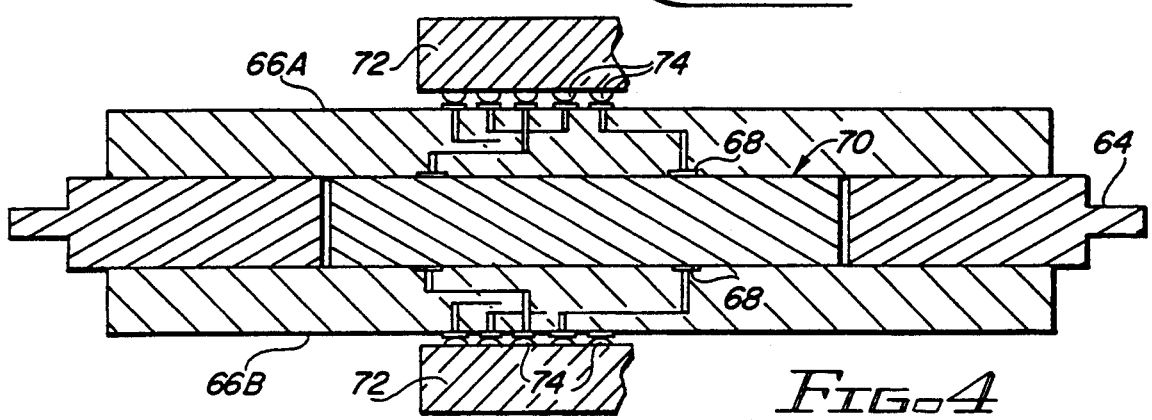

5,334,090

INTEGRATED CABIN PRESSURE CONTROLLER

BACKGROUND OF THE INVENTION

This invention relates to cabin pressure controllers.

In an aircraft cabin, ideal conditions for passenger comfort exist when cabin altitude is maintained at sea level and when cabin pressure rate of change is maintained at zero. However, these conditions can rarely be achieved. Therefore, a cabin pressure control system is required to the control cabin altitude and pressure rate in a manner that optimizes passenger comfort.

In a cabin pressure control system, the cabin is typically back-pressurized. At least one outflow valve regulates the rate of air flowing out of the cabin so as to control the pressure inside the cabin. A digital cabin pressure controller issues commands for opening or closing the outflow valve as required to control the cabin pressure. The commands are typically generated according to parameters such as isobaric cabin altitude, cabin pressure rate and pressure differential (i.e., the difference between cabin altitude and ambient pressure). A selector located in the cockpit permits the crew to select the parameters. Cabin altitude is supplied to the controller by a remote sensor, and ambient pressure is supplied by an airdata computer.

Conventional cabin pressure controllers are installed with a distributed approach. A primary controller, a backup controller, a manual controller, a selector and a display are all housed in separate boxes.

SUMMARY OF THE INVENTION

A cabin pressure controller according to this invention uses a different approach: the primary controller, backup controller, selector and display are located in a single housing. With this integrated approach, cost and weight of the cabin pressure controller are reduced. Overall reliability of the controller is increased when the primary controller is electrically isolated from the backup controller.

BRIEF DESCRIPTION OF THE DRAWINGS

FIG. 2 is a schematic diagram of an external connection for the controller; and

FIGS. 3 and 4 depict a module board which forms a part of the cabin pressure controller.

DETAILED DESCRIPTION OF THE INVENTION

Figure 1:
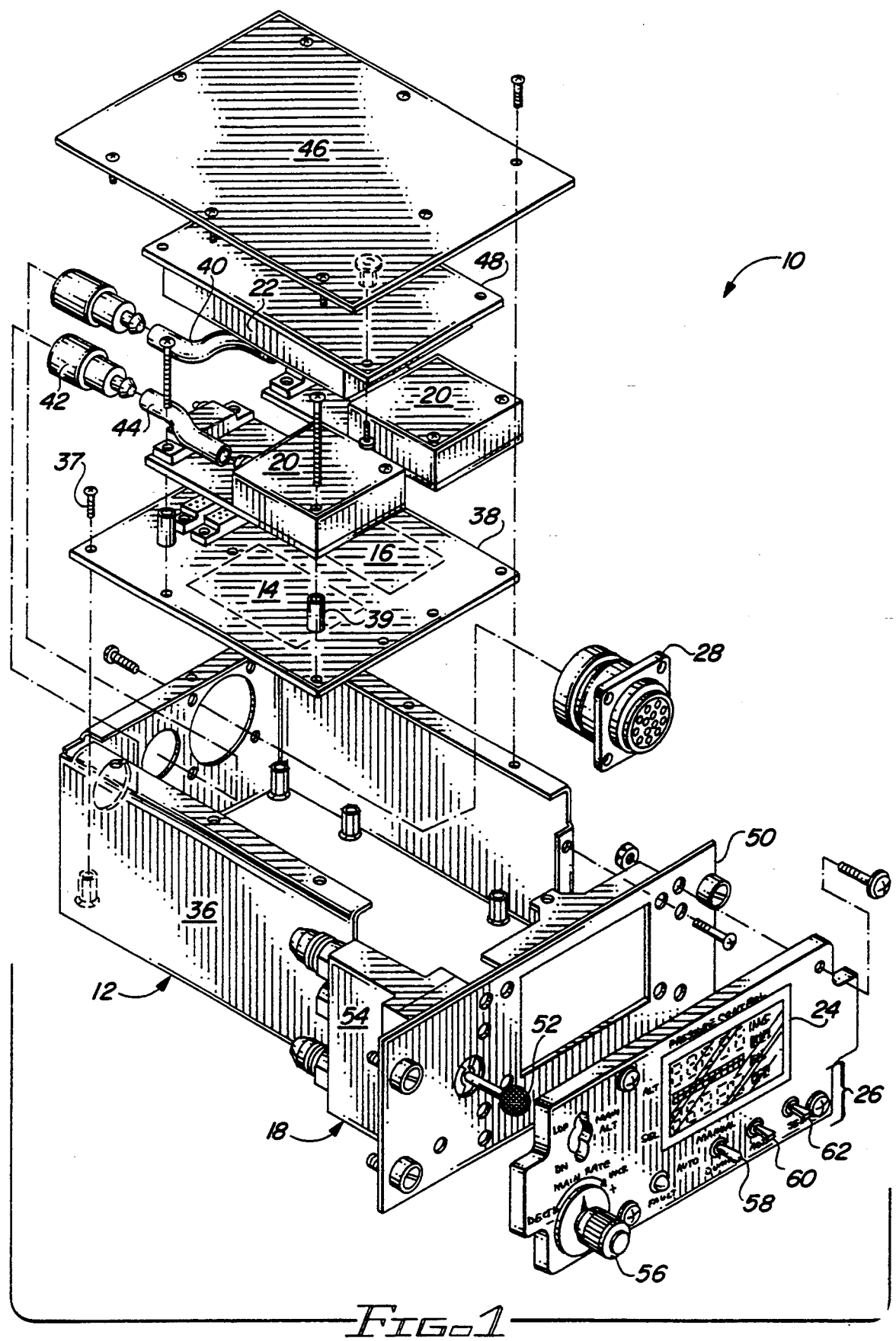
FIG. 1 is an exploded view of a cabin pressure controller according to this invention.

Referring to FIG. 1, a dual-channel integrated cabin pressure controller 10 includes a single housing 12 containing a primary digital controller 14, a backup digital controller 16, a manual controller 18, pressure sensors 20, a dual power supply 22, a display 24 and a selector 26. The primary and backup controllers 14 and 16 cooperate to generate analog signals for controlling outflow valves (not shown). Exemplary digital controllers 14 and 16 are described in the following U.S. patents: U.S. Pat. No. 4,164,894 ("SIMULTANEOUS STATE PREVENTION SYSTEM"); U.S. Pat. No. 4,164,895 ("MODE INDICATION SYSTEM"); U.S. Pat. No. 4,164,896 ("CONTROL ALTERNATING SYSTEM"); U.S. Pat. No. 4,164,897 ("CONTROL SCHEDULE LINEARIZATION SYSTEM"); U.S. Pat. No. 4,164,898 ("EXCESSIVE RATE DETECTION SYSTEM"); U.S. Pat. No. 4,164,899 ("PRESSURE DIFFERENTIAL SYSTEM"); U.S. Pat. No. 4,164,900 ("FLOW ANNUNCIATION SYSTEM"); and U.S. Pat. No. 4,553,474 ("AIRCRAFT CABIN PRESSURIZATION SYSTEM"). All of these patents are assigned to Allied-Signal, Inc., the assignee of this invention:

A "brick wall" approach allows for complete electrical isolation between the two digital controllers 14 and 16. The only connection between the two controllers 14 and 16 is a communication link, jumpered across an external connector 28. The communication link includes first and second serial digital links 30 and 32 whose signals are buffered by buffers 34 such as op amps (see FIG. 2). Electrical isolation increases the reliability of the controller 10. The brick wall approach prevents any errors that are developed in one channel from propagating to the other channel. Errors include microprocessor failures, memory faults, and shorts in the power supply 22. Thus, in the event one channel fails, the other channel will not be affected.

Two pressure sensors 20 are employed. When ambient pressure is supplied by an external source such as an airdata computer, one sensor 20 measures cabin altitude for the primary controller 14, and the other sensor 20 measures cabin altitude for the backup controller 16. This arrangement furthers electrical isolation between the channels. Alternatively, one sensor 20 could measure cabin altitude for both controllers 14 and 16, while the other sensor 20 measures cabin altitude for an external source such as an EICAS or backup display. If, however, ambient pressure is not available from an external source, then one sensor 20 must measure ambient pressure for both channels while the other sensor 20 measures cabin altitude for both channels.

Exemplary pressure sensors 20 can include quartz-based, capacitive pressure transducers whose capacitances change in proportion to sensed pressure changes. Such transducers are disclosed in U.S. Pat. Nos. 3,962,921 ("COMPENSATED PRESSURE TRANSDUCER"), 4,864,463 ("CAPACITIVE PRESSURE SENSOR") and 4,689,999 ("TEMPERATURE COMPENSATED PRESSURE TRANSDUCER"). Accompanying the transducers are electronic packages that convert the transducer outputs into digital signals indicating the changes in sensed pressures. Such electronic packages are disclosed in U.S. Pat. Nos. 4,763,063 ("COMPACT DIGITAL PRESSURE SENSOR CIRCUITRY"), 4,876,892 ("PRESSURE SENSOR") and 4,987,782 ("CAPACITIVE PRESSURE TRANSDUCER SYSTEM"). These patents are also assigned to Allied-Signal, Inc.

The dual power supply 22 includes two isolated supplies. One supply receives ac power from the aircraft bus and provides dc power to the primary controller 14; the other supply receives ac power from the aircraft bus and provides dc power to the backup controller 16. This arrangement furthers the brick wall approach. Any off-the-shelf supply can be employed.

The housing 12 includes an aluminum chassis 36 having an open end and a closed end. A first module board 38 containing the primary and backup controllers 14 and 16 is mounted to the base of the chassis 36 via mounting screws 37. The pressure sensors 20 are piggybacked onto the first module board 38 by spacers 39 and mounting screws 40. Fittings 42, mounted through the closed end of the chassis 36, and hoses 44 provide fluid communication to their respective pressure sensors 20. Within the housing 12 are located four ARINC 429 buses (not shown), two for the primary channel and two for the backup channel. The buses connect the controllers 14 and 16 to the external I/O connector 28, which is mounted through the closed end of the chassis 36. In addition to allowing the controllers 14 and 16 to be jumpered externally, the connector 28 allows the integrated controller 10 to communicate with other aircraft instrumentation such as an airdata computer, EICAS, backup display, and centralized data logging or diagnostic system.

The housing 12 further includes a top cover 46 to which a second module board 48 containing the power supply 22 is mounted. The top cover 46, in turn, is mounted to the top of the chassis 36. The housing is fully enclosed by a front cover 50 which is mounted to the open end of the chassis 36. Because the various components within the housing 12 dissipate low levels of energy, the housing 12 need not be ventilated.

The manual controller 18 is mounted to the front cover 50, external to the chassis 36. Purely pneumatic, the manual controller 18 includes a pneumatic toggle switch 52 and a housing 54 which houses a pneumatic rate control, a vacuum regulator and isobaric hold pneumatics. The pneumatic toggle switch 52 can be moved up and down to select the cabin pressure. Maximum cabin pressure rate is set by a rotary switch 56. The manual controller 18 provides an added level of safety. In the event that all electrical power is lost, the manual controller 18 allows the outflow valves to be controlled pneumatically. Such pneumatic controllers are well known.

Mounted to the front cover 50, external the chassis 32, is the electro-luminescent display 24 which includes a liquid crystal display (LCD). The LCD displays landing altitude, cabin altitude, cabin pressure rate and differential pressure, as well as built-in-test results. The LCD is temperature-controlled and back-lit variable to adapt to ambient lighting conditions. It is also non-polarized so as not to "blink" when the viewing angle is changed. The LCD is electrically coupled to the first module board 38 via a serial link.

Also mounted to the front cover 50 is the selector 26, whose switches allows the pilot to select all modes of operation. A first momentary switch 58 selects the mode of operation, either auto, manual or dump. A second momentary switch 60 selects a parameter for adjustment or display (e.g., landing altitude, cabin pressure, cabin rate differential pressure or built-in test). A third momentary switch 62 adjusts the selected parameter.

The controller 10 is installed on the cockpit panel. The housing 12 is mounted on rails (not shown) with a standard 5¼" Zeus mount, an aircraft mounting specification. The rails allow the housing 12 to be mounted in any orientation.

Referring now to FIGS. 3 and 4, the module boards 38 and 48 are constructed as heat sink cores 64 that are sandwiched between two printed wire boards 66A and 66B. The heat sink cores 64 can be made of aluminum or Copper-"INVAR"-Copper, and the printed wire boards 66A, 66B can be made of a standard material. The printed wire boards 66A, 66B are screwed onto the heat sink core 64 for easy disassembly and testability, and they can be electrically connected together by conductor pads 68 and an interconnect element 70 which can be made of conductive rubber or flex cable. Between the heat sink core 64 and each printed wire board 66A, 66B is an insulator such as mylar (not shown). The insulator prevents shorts from occurring. Stiffeners 69 prevent the printed wire boards from flexing under acceleration. The heat sink core 64 itself also functions as a stiffener.

Passive and active components 72 making up the controllers 14 and power supply 22, etc., are mounted to the printed wire boards 66A, 66B by surface mount technology (SMT). Thus, no leads penetrate the boards 66A, 66B; all paths are soldered to the surface by solder pads 74. This technology reduces the size of the module boards 34 and 46 and provides for a higher degree of integration. Alternatively, MCM or monolithic ASICs could be used to achieve an even higher degree of integration.

To achieve an even greater degree of integration, portions of the heat sink core 64 are hogged out, allowing passive components 72 such as decoupling capacitors and pull-up resistor to be placed in the hogged-out portions. Because heat cannot be allowed to dissipate within the core 64 (it would have no place to go), active components 72 cannot be located within the hogged-out portions. The hogged-out portions provide for more surface area to mount the components 72, thereby increasing overall effective component area.

It will be understood that the embodiments described herein are merely exemplary and that a person skilled in the art may make modifications and variations without departing from the spirit and scope of the invention. All such modifications and variations are intended to be included within the scope of the invention as defined in the appended claims.

I claim:

1. Apparatus for generating cabin pressure commands, comprising:
   a housing
   primary controller means, mounted within said housing, for generating said commands according to at least one parameter;
   backup controller means, mounted within said housing, for selectively generating said commands instead of said primary controller means;
   selector means, mounted on a visible surface of said housing, for allowing said at least one parameter to be set; and
   display means, mounted on a visible surface of said housing, for selectively displaying said at least one parameter.

2. The apparatus of claim 1, wherein said primary and backup controller means are digital controllers, and wherein said apparatus further includes connection means, located outside of said housing, for electrically connecting said primary digital controller to said backup digital controller, whereby said primary digital controller is electrically isolated from said backup digital controller.

3. The apparatus of claim 2, wherein said connection means includes an I/O connector connected to said digital controllers; and a plurality of serial digital links jumpering said controllers across said I/O connector.

4. The apparatus of claim 2, wherein said connection means further includes buffering means for buffering signals on said serial digital links.

5. The apparatus of claim 2, further comprising at least two pressure sensor means for supplying pressure signals indicative of cabin pressure, each said sensor means providing said signal to a corresponding one digital controller.

6. The apparatus of claim 2, further comprising at least two power supply means for supplying electrical power, each said power supply means providing said power to a corresponding one digital controller.

7. The apparatus of claim 2, wherein said housing includes a chassis and mounting means for mounting said primary and backup digital controllers to said chassis.

8. The apparatus of claim 7, wherein said mounting means includes at least one assembly of a heat sink core that is sandwiched by first and second printed wire boards.

9. The apparatus of claim 8, wherein portions of said heat sink core are hogged out, wherein said primary and backup digital controllers are realized at least in part by active and passive components, and wherein at least some of said passive components are located within said hogged-out portions.

10. The apparatus of claim 8, wherein said primary and backup digital controllers are mounted to said boards by surface mount technology.

11. The apparatus of claim 8, wherein at least one of said assemblies further includes an elastomeric interconnect for electrically connecting said first and second boards.

12. The apparatus of claim 1, further comprising manual control means for manually generating a second set of cabin pressure commands, said manual control means being selectively operated instead of said primary and backup controller means.

13. The apparatus of claim 1, wherein said display means includes an LCD.

14. Apparatus for generating cabin pressure commands, comprising:
   a housing
   a primary digital controller, mounted within said housing, for generating said commands according to at least one parameter;
   a backup digital controller, mounted within said housing, for selectively generating said commands instead of said primary controller means;
   connection means, located outside of said housing, for electrically connecting said primary digital controller to said backup digital controller, whereby said primary digital controller is electrically isolated from said backup digital controller.
   selector means, mounted on a visible surface of said housing, for allowing said at least one parameter to be set;
   display means, mounted on a visible surface of said housing, for selectively displaying said at least one parameter; and
   at least one power supply means for supplying electrical power, each said power supply means providing said power to a corresponding one digital controller.

15. The apparatus of claim 14, further comprising at least two pressure sensor means for supplying pressure signals indicative of cabin altitude, each said sensor means providing said signal to a corresponding one digital controller.

16. The apparatus of claim 14, wherein said housing includes a chassis; a first board for mounting said primary and backup digital controllers to said chassis, and a second board for mounting said power supply means to said chassis, each said board including a heat sink core and first and second printed wire boards that sandwich said heat sink core.

17. The apparatus of claim 16, wherein portions of said heat sink core are hogged out in at least one of said boards, and wherein at least some passive components are located within said hogged-out portions.

18. The apparatus of claim 16, wherein said primary and backup digital controllers are mounted to said boards by surface mount technology.

19. The apparatus of claim 16, wherein at least one of said boards further includes an elastomeric interconnect for electrically connecting said first and second printed wire boards.

20. The apparatus of claim 14, wherein said connection means includes an I/O connector connected to said digital controllers; a plurality of serial digital links jumpering said controllers across said I/O connector; and buffering means for buffering signals on said serial digital links.

* * * * *